United States Patent
Venkataramani et al.

(10) Patent No.: US 9,514,245 B2
(45) Date of Patent: Dec. 6, 2016

(54) DISTRIBUTED CACHE FOR GRAPH DATA

(71) Applicant: Facebook, Inc., Menlo Park, CA (US)

(72) Inventors: Venkateshwaran Venkataramani, Sunnyvale, CA (US); George Cabrera, III, Redwood City, CA (US); Venkatasiva Prasad Chakkabala, Sunnyvale, CA (US); Mark Marchukov, Mountain View, CA (US); Dmitri Petrov, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/337,425

(22) Filed: Jul. 22, 2014

(65) Prior Publication Data

US 2014/0330840 A1 Nov. 6, 2014

Related U.S. Application Data

(63) Continuation of application No. 13/227,393, filed on Sep. 7, 2011, now Pat. No. 8,832,111.

(60) Provisional application No. 61/428,799, filed on Dec. 30, 2010.

(51) Int. Cl.
*G06F 17/30* (2006.01)
*G06F 12/08* (2016.01)
*H04L 29/08* (2006.01)

(52) U.S. Cl.
CPC ..... *G06F 17/30958* (2013.01); *G06F 12/0844* (2013.01); *G06F 17/3033* (2013.01); *G06F 17/3048* (2013.01); *G06F 17/30424* (2013.01); *G06F 17/30457* (2013.01); *G06F 17/30554* (2013.01); *G06F 17/30575* (2013.01); *G06F 17/30876* (2013.01); *G06F 17/30902* (2013.01); *H04L 67/2842* (2013.01);

(Continued)

(58) Field of Classification Search
CPC ............ G06F 17/3048; G06F 17/30902; G06F 17/30424; G06F 17/30457; G06F 17/30554; G06F 17/30958; H04L 67/2842

See application file for complete search history.

(56) References Cited

U.S. PATENT DOCUMENTS

| | | | |
|---|---|---|---|
| 5,448,727 A | 9/1995 | Annevelink | |
| 7,096,213 B2 * | 8/2006 | Chatterjee | ........... G06F 17/3056 |
| 7,555,412 B2 | 6/2009 | Nath | |

(Continued)

FOREIGN PATENT DOCUMENTS

KR 10-2010-0105568 9/2010

OTHER PUBLICATIONS

Notice of Allowance for KR 10-2016-7001846, Jun. 21, 2016.

*Primary Examiner* — Tuan A Pham
*Assistant Examiner* — Merilyn Nguyen
(74) *Attorney, Agent, or Firm* — Baker Botts L.L.P.

(57) ABSTRACT

In one embodiment, a system includes a database; and a cache layer comprising one or more cache nodes, the one or more cache nodes operative to: maintain in a memory one or more data structures storing association information describing associations between nodes in a graph a plurality of distributed cache clusters for storing information in the form of a graph, the graph comprising a plurality of nodes, each uniquely identified by a node identifier, and edge information indicating associations between nodes; respond to queries for associations between nodes in the graph by accessing the memory; and forward other queries to the database for processing.

20 Claims, 4 Drawing Sheets

(52) U.S. Cl.
CPC .. *G06F 17/30132* (2013.01); *G06F 17/30595* (2013.01); *G06F 2212/463* (2013.01)

(56) References Cited

U.S. PATENT DOCUMENTS

| | | | |
|---|---|---|---|
| 7,860,894 B2 | 12/2010 | Rohwedder | |
| 7,870,081 B2* | 1/2011 | Li | G06N 7/005 706/12 |
| 8,244,848 B1* | 8/2012 | Narayanan | G06Q 50/01 709/218 |
| 8,326,865 B2 | 12/2012 | Dettinger | |
| 8,473,582 B2* | 6/2013 | Ananthanarayanan | G06F 17/30132 709/212 |
| 8,495,250 B2* | 7/2013 | Ananthanarayanan | G06F 12/0866 709/249 |
| 9,208,207 B2 | 12/2015 | Venkataramani | |
| 2002/0166031 A1 | 11/2002 | Chen | |
| 2004/0033610 A1 | 2/2004 | Hampton | |
| 2007/0094214 A1* | 4/2007 | Li | G06N 7/005 706/52 |
| 2007/0101069 A1* | 5/2007 | Corbett | G06F 12/0815 711/141 |
| 2007/0230468 A1 | 10/2007 | Narayanan | |
| 2008/0195584 A1 | 8/2008 | Nath | |
| 2009/0059842 A1 | 3/2009 | Maltseff | |
| 2009/0248709 A1 | 10/2009 | Fuhrmann | |
| 2009/0281988 A1* | 11/2009 | Yoo | G06F 17/30867 |
| 2011/0145307 A1* | 6/2011 | Ananthanarayanan et al. | 707/827 |
| 2011/0145363 A1 | 6/2011 | Ananthanarayanan | |
| 2012/0110678 A1* | 5/2012 | Kumble | 726/28 |
| 2012/0173541 A1 | 7/2012 | Venkataramani | |
| 2012/0173820 A1 | 7/2012 | Venkataramani | |
| 2012/0173845 A1 | 7/2012 | Venkataramani | |
| 2012/0215785 A1* | 8/2012 | Singh | G06F 17/30867 707/741 |
| 2014/0074876 A1 | 3/2014 | Venkataramani | |
| 2016/0085881 A1 | 3/2016 | Venkataramani | |

\* cited by examiner

DISTRIBUTED CACHE FOR GRAPH DATA

PRIORITY

This application is a continuation under 35 U.S.C. §120 of U.S. patent application Ser. No. 13/227,393, filed 7 Sep. 2011, which claims the benefit under 35 U.S.C. §119(e) of U.S. Provisional Patent Application No. 61/428,799, filed 30 Dec. 2010, each of which is incorporated herein by reference.

TECHNICAL FIELD

The present disclosure relates generally to storing and serving graph data, and more particularly, to storing and serving graph data with a distributed cache system.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view web pages created or customized by other users where visibility and interaction with such pages by other users is governed by some characteristic set of rules.

Such social networking information, and most information in general, is typically stored in relational databases. Generally, a relational database is a collection of relations (frequently referred to as tables). Relational databases use a set of mathematical terms, which may use Structured Query Language (SQL) database terminology. For example, a relation may be defined as a set of tuples that have the same attributes. A tuple usually represents an object and information about that object. A relation is usually described as a table, which is organized into rows and columns. Generally, all the data referenced by an attribute are in the same domain and conform to the same constraints.

The relational model specifies that the tuples of a relation have no specific order and that the tuples, in turn, impose no order on the attributes. Applications access data by specifying queries, which use operations to identify tuples, identify attributes, and to combine relations. Relations can be modified and new tuples can supply explicit values or be derived from a query. Similarly, queries identify may tuples for updating or deleting. It is necessary for each tuple of a relation to be uniquely identifiable by some combination (one or more) of its attribute values. This combination is referred to as the primary key. In a relational database, all data are stored and accessed via relations. Relations that store data are typically implemented with or referred to as tables.

Relational databases, as implemented in relational database management systems, have become a predominant choice for the storage of information in databases used for, for example, financial records, manufacturing and logistical information, personnel data, and other applications. As computer power has increased, the inefficiencies of relational databases, which made them impractical in earlier times, have been outweighed by their ease of use for conventional applications. The three leading open source implementations are MySQL, PostgreSQL, and SQLite. MySQL is a relational database management system (RDBMS) that runs as a server providing multi-user access to a number of databases. The "M" in the acronym of the popular LAMP software stack refers to MySQL. Its popularity for use with web applications is closely tied to the popularity of PHP (the "P" in LAMP). Several high-traffic web sites use MySQL for data storage and logging of user data.

As communicating with relational databases is often a speed bottleneck, many networks utilize caching systems to serve particular information queries. For example, Memcached is a general-purpose distributed memory caching system. It is often used to speed up dynamic database-driven websites by caching data and objects in RAM to reduce the number of times an external data source (such as a database or API) must be read. Memcached's APIs provide a giant hash table distributed across multiple machines. When the table is full, subsequent inserts cause older data to be purged in least recently used (LRU) order. Applications using Memcached typically layer requests and additions into core before falling back on a slower backing store, such as a database.

The Memcached system uses a client-server architecture. The servers maintain a key-value associative array; the clients populate this array and query it. Clients use client side libraries to contact the servers. Typically, each client knows all servers and the servers do not communicate with each other. If a client wishes to set or read the value corresponding to a certain key, the client's library first computes a hash of the key to determine the server that will be used. The client then contacts that server. The server will compute a second hash of the key to determine where to store or read the corresponding value. Typically, the servers keep the values in RAM; if a server runs out of RAM, it discards the oldest values. Therefore, clients must treat Memcached as a transitory cache; they cannot assume that data stored in Memcached is still there when they need it.

DESCRIPTION OF EXAMPLE EMBODIMENTS

Particular embodiments relate to a distributed caching system for storing and serving information modeled as a graph that includes nodes and edges that define associations or relationships between nodes that the edges connect in the graph. In particular embodiments, the graph is, or includes, a social graph, and the distributed caching system is part of a larger networking system, infrastructure, or platform that enables an integrated social network environment. In the present disclosure, the social network environment may be described in terms of a social graph including social graph information. In fact, particular embodiments of the present disclosure rely on, exploit, or make use of the fact that most or all of the data stored by or for the social network environment can be represented as a social graph. Particular embodiments provide a cost-effective infrastructure that can efficiently, intelligently, and successfully scale with the exponentially increasing number of users of the social network environment such as that described herein.

In particular embodiments, the distributed caching system and backend infrastructure described herein provides one or more of: low latency at scale, a lower cost per request, an easy to use framework for developers, an infrastructure that supports multi-master, an infrastructure that provides access to stored data to clients written in languages other than Hypertext Preprocessor (PHP), an infrastructure that enables combined queries involving both associations (edges) and objects (nodes) of a social graph as described by way of example herein, and an infrastructure that enables different persistent data stores to be used for different types of data. Furthermore, particular embodiments provide one or more of: an infrastructure that enables a clean separation of the data access API from the caching+persistence+replication infrastructure, an infrastructure that supports write-through/read-through caching, an infrastructure that moves computations closer to the data, an infrastructure that enables transparent migration to different storage schemas and back ends, and an infrastructure that improves the efficiency of data object access.

Additionally, as used herein, "or" may imply "and" as well as "or;" that is, "or" does not necessarily preclude "and," unless explicitly stated or implicitly implied.

Figure 3:
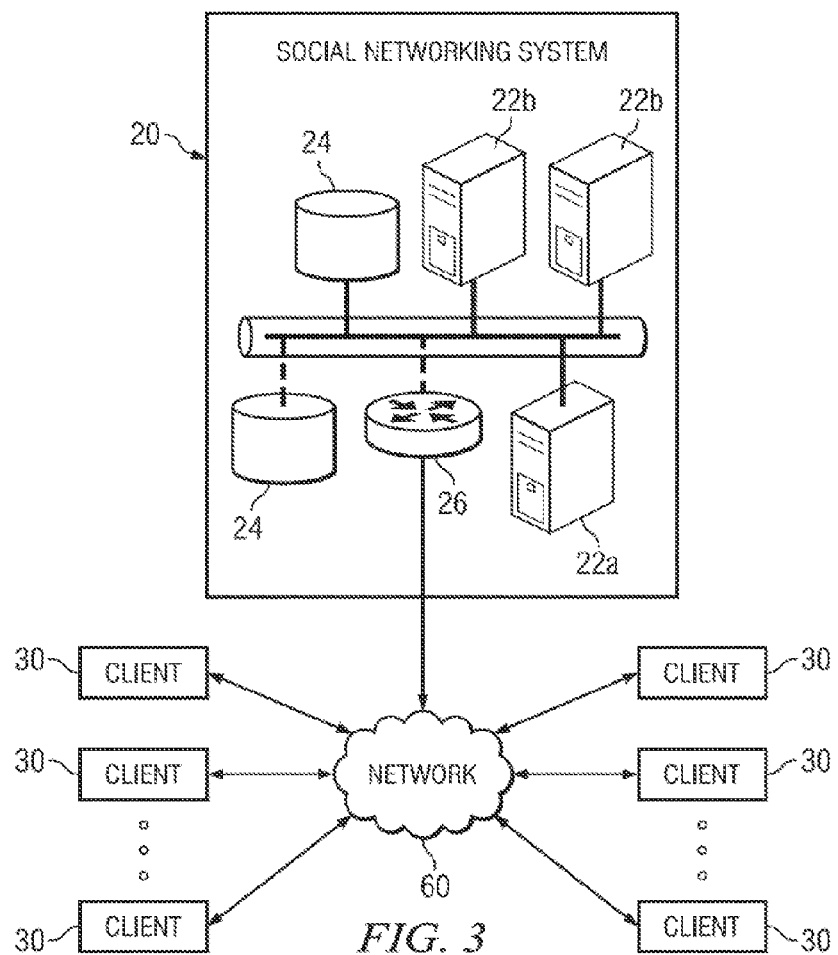
FIG. 3 provides an example network environment.

Particular embodiments may operate in a wide area network environment, such as the Internet, including multiple network addressable systems. FIG. 3 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 3 illustrates, particular embodiments may operate in a network environment comprising social networking system 20 and one or more client devices 30. Client devices 30 are operably connected to the network environment via a network service provider, a wireless carrier, or any other suitable means.

In one example embodiment, social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships between different users. The relationship information may indicate users who have similar or common work experience, group memberships, hobbies, or educational history. A user profile may also include privacy settings governing access to the user's information is to other users.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network.

In particular implementations, the client applications allow a user of client device 30 to enter addresses of specific network resources to be retrieved, such as resources hosted by social networking system 20. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

Figure 1:
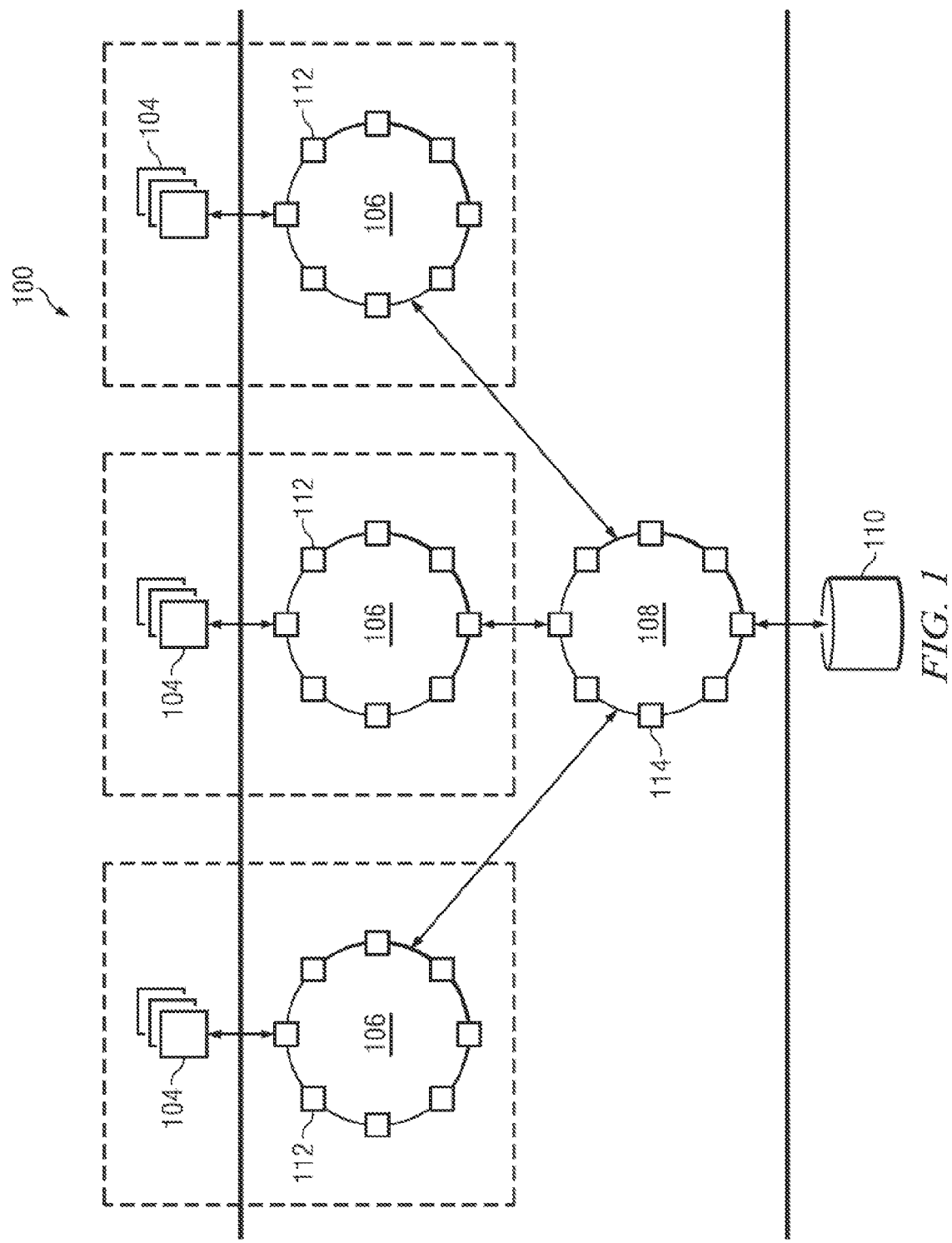
FIG. 1 illustrates an example caching system architecture according to one implementation of the invention.

FIG. 1 illustrates an example embodiment of a networking system, architecture, or infrastructure 100 (hereinafter referred to as networking system 100) that can implement the back end functions of social networking system 20 illustrated in FIG. 3. In particular embodiments, networking system 100 enables users of networking system 100 to interact with each other via social networking services provided by networking system 100 as well as with third parties. For example, users at remote user computing devices (e.g., personal computers, netbooks, multimedia devices, cellular phones (especially smart phones), etc.) may access networking system 100 via web browsers or other user client applications to access websites, web pages, or web applications hosted or accessible, at least in part, by networking system 100 to view information, store or update information, communicate information, or otherwise interact with other users, third party websites, web pages, or web applications, or other information stored, hosted, or accessible by networking system 100. In particular embodiments, networking system 100 maintains a graph that includes graph nodes representing users, concepts, topics, and other information (data), as well as graph edges that connect or define relationships between graph nodes, as described in more detail below.

Figure 5:
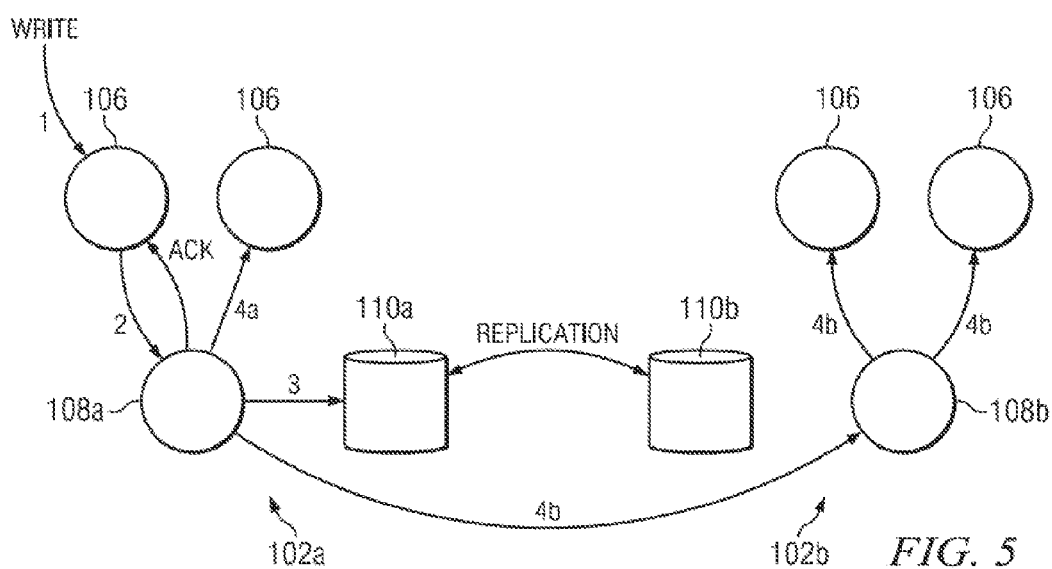
FIG. 5 is a schematic diagram illustrating an example message flow between various components of a caching system.

With reference to FIGS. 1 and 5, in particular embodiments, networking system 100 includes one or more data centers 102. For example, networking system 100 may include a plurality of data centers 102 located strategically within various geographic regions for serving users located within respective regions. In particular embodiments, each data center includes a number of client or web servers 104 (hereinafter client servers 104) that communicate information to and from users of networking system 100. For example, users at remote user computing devices may communicate with client servers 104 via load balancers or other suitable systems via any suitable combination of networks and service providers. Client servers 104 may query the caching system described herein in order to retrieve data to generate structured documents for responding to user requests.

Each of the client servers 104 communicates with one or more follower distributed cache clusters or rings 106 (hereinafter follower cache clusters 106). In the illustrated embodiment, data center 102 includes three follower cache clusters 106 that each serve a subset of the web servers 104. In particular embodiments, a follower cache cluster 106 and the client servers 104 the follower cache cluster 106 serves are located in close proximity, such as within a building, room, or other centralized location, which reduces costs associated with the infrastructure (e.g., wires or other communication lines, etc.) as well as latency between the client servers 104 and respective serving follower cache cluster 106. However, in some embodiments, while each of the follower cache clusters 106, and the client servers 104 they respectively serve, may be located within a centralized location, each of the follower cache clusters 106 and respective client servers 104 the follower cache clusters 106 respectively serve, may be located in a different location than the other follower cache clusters 106 and respective client servers 104 of a given data center; that is, the follower cache clusters 106 (and the respective client servers 104 the clusters serve) of a given data center of a given region may be distributed throughout various locations within the region.

In particular embodiments, each data center 102 further includes a leader cache cluster 108 that communicates information between the follower cache clusters 106 of a given data center 102 and a persistent storage database 110 of the given data center 102. In particular embodiments, database 110 is a relational database. In particular embodiments, leader cache cluster 108 may include a plug-in operative to interoperate with any suitable implementation of database 110. For example, database 110 may be implemented as a dynamically-variable plug-in architecture and may utilize MySQL, and/or any suitable relational database management system such as, for example, HAYSTACK, CASSANDRA, among others. In one implementation, the plug-in performs various translation operations, such as translating data stored in the caching layer as graph nodes and edges to queries and commands suitable for a relational database including one or more tables or flat files. In particular embodiments, leader cache cluster 108 also coordinates write requests to database 110 from follower cache clusters 106 and sometimes read requests from follower cache clusters 106 for information cached in leader cache cluster 108 or (if not cached in leader cache cluster 108) stored in database 110. In particular embodiments, leader cache cluster 108 further coordinates the synchronization of information stored in the follower cache clusters 106 of the respective data center 102. That is, in particular embodiments, the leader cache cluster 108 of a given data center 102 is configured to maintain cache consistency (e.g., the information cached) between the follower cache clusters 106 of the data center 102, to maintain cache consistency between the follower cache clusters 106 and the leader cache cluster 108, and to store the information cached in leader cache cluster 108 within database 110. In one implementation, a leader cache cluster 108 and a follower cache cluster 106 can be considered a caching layer between client servers 104 and database 110.

In one implementation, the caching layer is a write-thru/read-thru caching layer, wherein all reads and writes traverse the caching layer. In one implementation, the caching layer maintains association information and, thus, can handle queries for such information. Other queries are passed through to database 110 for execution. Database 110 generally connotes a database system that may itself include other caching layers for handling other query types.

Each follower cache cluster 106 may include a plurality of follower cache nodes 112, each of which may be running on an individual computer, computing system, or server. However, as described above, each of the follower cache nodes 112 of a given follower cache cluster 106 may be located within a centralized location. Similarly, each leader cache cluster 108 may include a plurality of leader cache nodes 114, each of which may be running on an individual computer, computing system, or server. Similar to the follower cache nodes 112 of a given follower cache cluster 106, each of the leader cache nodes 114 of a given leader cache cluster 108 may be located within a centralized location. For example, each data center 102 may include tens, hundreds, or thousands of client servers 104 and each follower cache cluster 106 may include tens, hundreds, or thousands of follower cache nodes 112 that serve a subset of the client servers 104. Similarly, each leader cache cluster 108 may include tens, hundreds, or thousands of leader cache nodes 114. In particular embodiments, each of the follower cache nodes 112 within a given follower cache cluster 106 may only communicate with the other follower cache nodes 112 within the particular follower cache cluster 106, the client servers 104 served by the particular follower cache cluster 106, and the leader cache nodes 114 within the leader cache cluster 108.

In particular embodiments, information stored by networking system 100 is stored within each data center 102 both within database 110 as well as within each of the follower and leader cache clusters 106 and 108, respectively. In particular embodiments, the information stored within each database 110 is stored relationally (e.g., as objects and tables via MySQL), whereas the same information is stored within each of the follower cache clusters 106 and the leader cache cluster 108 in a number of data shards stored by each of the follower and leader cache clusters 106 and 108, respectively, in the form of a graph including graph nodes and associations or connections between nodes (referred to herein as graph edges). In particular embodiments, the data shards of each of the follower cache clusters 106 and leader cache cluster 108 are bucketized or divided among the cache nodes 112 or 114 within the respective cache cluster. That is, each of the cache nodes 112 or 114 within the respective cache cluster stores a subset of the shards stored by the cluster (and each set of shards stored by each of the follower and leader cache clusters 106 and 108, respectively, stores the same information, as the leader cache cluster synchronizes the shards stored by each of the cache clusters of a given data center 102, and, in some embodiments, between data centers 102).

In particular embodiments, each graph node is assigned a unique identifier (ID) (hereinafter referred to as node ID) that uniquely identifies the graph node in the graph stored by each of the follower and leader cache clusters 106 and 108, respectively, and database 110; that is, each node ID is globally unique. In one implementation, each node ID is a 64-bit identifier. In one implementation, a shard is allocated a segment of the node ID space. In particular embodiments, each node ID maps (e.g., arithmetically or via come mathematical function) to a unique corresponding shard ID; that is, each shard ID is also globally unique and refers to the same data object in each set of shards stored by each of the follower and leader cache clusters 106 and 108, respectively. In other words, all data objects are stored as graph nodes with unique node IDs and all the information stored in the graph in the data shards of each of the follower and leader cache clusters 106 and 108, respectively, is stored in the data shards of each of the follower and leader cache clusters 106 and 108, respectively, using the same corresponding unique shard IDs.

As just described, in particular embodiments, the shard ID space (the collection of shard IDs and associated information stored by all the shards of each cache cluster, and replicated in all of the other follower cache clusters 106 and leader cache cluster 108) is divided among the follower or leader cache nodes 112 and 114, respectively, within the follower or leader cache clusters 106 and 108, respectively. For example, each follower cache node 112 in a given follower cache cluster 106 may store a subset of the shards (e.g., tens, hundreds, or thousands of shards) stored by the respective follower cache cluster 106 and each shard is assigned a range of node IDs for which to store information, including information about the nodes whose respective node IDs map to the shard IDs in the range of shard IDs stored by the particular shard. Similarly, each leader cache node 114 in the leader cache cluster 108 may store a subset of the shards (e.g., tens, hundreds, or thousands of shards) stored by the respective leader cache cluster 108 and each shard is assigned a range of node IDs for which to store information, including information about the nodes whose respective node IDs map to the shard IDs in the range of shard IDs stored by the particular shard.

However, as described above, a given shard ID corresponds to the same data objects stored by the follower and leader cache clusters 106 and 108, respectively. As the number of follower cache nodes 106 within each follower cache cluster 106 and the number of leader cache nodes 114 within the leader cache cluster 108 may vary statically (e.g., the follower cache clusters 106 and the leader cache cluster 108 may generally include different numbers of follower cache nodes 112 and leader cache nodes 114, respectively) or dynamically (e.g., cache nodes within a given cache cluster may be shut down for various reasons periodically or as needed for fixing, updating, or maintenance), the number of shards stored by each of the follower cache nodes 112 and leader cache nodes 114 may vary statically or dynamically within each cache cluster as well as between cache clusters. Furthermore, the range of shard IDs assigned to each shard may also vary statically or dynamically.

In particular embodiments, each of the follower cache nodes 112 and leader cache nodes 114 includes graph management software that manages the storing and serving of information cached within the respective cache node. In particular embodiments, the graph management software running on each of the cache nodes of a given cache cluster may communicate to determine which shards (and corresponding shard IDs) are stored by each of the cache nodes within the respective cache cluster. Additionally, if the cache node is a follower cache node 112, the graph management software running on the follower cache node 112 receives requests (e.g., write or read requests) from client servers 104, serves the requests by retrieving, updating, deleting, or storing information within the appropriate shard within the follower cache node, and manages or facilitates communication between the follower cache node 112 and other follower cache nodes 112 of the respective follower cache cluster 106 as well as communication between the follower cache node 112 and the leader cache nodes 114 of the leader cache cluster 108. Similarly, if the cache node is a leader cache node 114, the graph management software running on the leader cache node 114 manages the communication between the leader cache node 114 and follower cache nodes 112 of the follower cache clusters 106 and the other leader cache nodes 114 of the leader cache cluster 108, as well as communication between the leader cache node 114 and database 110. The graph management software running on each of the cache nodes 112 and 114 understands that it is storing and serving information in the form of a graph.

In particular embodiments, the graph management software on each follower cache node 112 is also responsible for maintaining a table that it shares with the other cache nodes 112 of the respective follower cache cluster 106, the leader cache nodes 114 of the leader cache cluster 108, as well as the client servers 104 that the respective follower cache cluster 106 serves. This table provides a mapping of each shard ID to the particular cache node 112 in a given follower cache cluster 106 that stores the shard ID and information associated with the shard ID. In this way, the client servers 104 served by a particular follower cache cluster 106 know which of the follower cache nodes 112 within the follower cache cluster 106 maintain the shard ID associated with information the client server 104 is trying to access, add, or update (e.g., a client server 104 may send write or read requests to the particular follower cache node 112 that stores, or will store, the information associated with a particular shard ID after using the mapping table to determine which of the follower cache nodes 112 is assigned, and stores, the shard ID). Similarly, in particular embodiments, the graph management software on each leader cache node 114 is also responsible for maintaining a table that it shares with the other cache nodes 114 of the respective leader cache cluster 108, as well as the follower cache nodes 112 of the follower cache clusters 106 that the leader cache cluster 108 manages. Furthermore, in this way, each follower cache node 112 in a given follower cache cluster 106 knows which of the other follower cache nodes 112 in the given follower cache cluster 106 stores which shard IDs stored by the respective follower cache cluster 106. Similarly, in this way each leader cache node 114 in the leader cache cluster 108 knows which of the other leader cache nodes 114 in the leader cache cluster 108 stores which shard IDs stored by the leader cache cluster 108. Furthermore, each follower cache node 112 in a given follower cache cluster 106 knows which of the leader cache nodes 114 in the leader cache cluster 108 stores which shard IDs. Similarly, each leader cache node 114 in the leader cache cluster 108 knows which of the follower cache nodes 112 in each of the follower cache clusters 106 stores which shard IDs.

In particular embodiments, information regarding each node in the graph, and in particular example embodiments a social graph, is stored in a respective shard of each of the follower cache clusters 106 and leader cache cluster 108 based on its shard ID. Each node in the graph, as discussed above, has a node ID. Along with the shard ID, the respective cache node 112 or 114 may store a node type parameter identifying a type of the node, as well as one or more name-value pairs (such as content (e.g., text, media, or URLs to media or other resources)) and metadata (e.g., a timestamp when the node was created or modified). In particular embodiments, each edge in the graph, and in particular example embodiments a social graph, is stored with each node the edge is connected to. For example, most edges are bi-directional; that is, most edges each connect two nodes in the graph. In particular embodiments, each edge is stored in the same shard with each node the edge connects. For example, an edge connecting node ID1 to node ID2 may be stored with the shard ID corresponding to node ID1 (e.g., shard ID1) and with the shard ID corresponding to node ID2 (e.g., shard ID2), which may be in different shards or even different cache nodes of a given cache cluster. For example, the edge may be stored with shard ID1 in the form of {node ID1, edge type, node ID2} where the edge type indicates the type of edge. The edge may also include metadata (e.g., a timestamp indicating when the edge was created or modified). The edge may also be cached with shard ID2 in the form of (node ID1, edge type, node ID2). For example, when a user of social networking system 100 establishes a contact relationship with another user or a fan relationship with a concept or user, the edge relationship of type "friend" or "fan" may be stored in two shards, a first shared corresponding to the shard to which the user's identifier is mapped and a second shard to which the object identifier of the other user or concept is mapped.

Networking system 100, and particularly the graph management software running on the follower cache nodes 112 of follower cache clusters 106 and the leader cache nodes 114 of the leader cache cluster 108, support a number of queries received from client servers 104 as well as to or from other follower or leader cache nodes 112 and 114, respectively. For example, the query object_add{ID1, node type1, metadata (not always specified), payload (not always specified)} causes the receiving cache node to store a new node with the node ID1 specified in the query of the specified node type1 in the shard the node ID1 corresponds to. The receiving cache node also stores with the node ID1 the metadata (e.g., a timestamp) and payload (e.g., name-value pairs and/or content such as text, media, resources, or references to resources), if specified. As another example, the query object_update{ID1, node type1 (not always specified), metadata (not always specified), payload (not always specified)} causes the receiving cache node to update the node identified by node ID1 specified in the query (e.g., change the node type to the node type1 specified in the query, update the metadata with the metadata specified in the query, or update the content stored with the payload specified in the query) in the corresponding shard. As another example, the query object_delete{node ID1} causes the receiving cache node to delete the node identified by node ID1 specified in the query. As another example, the query object_get{node ID1} causes the receiving cache node to retrieve the content stored with the node identified by node ID1 specified in the query.

Now referring to edge queries (as opposed to the node queries just described), the query assoc_add{ID1, edge type1, ID2, metadata (not always specified)} causes the receiving cache node (which stores node ID1) to create an edge between the node identified by node ID1 and the node identified by node ID2 of edge type edge type1 and to store the edge with the node identified by node ID1 along with the metadata (e.g., a timestamp indicating when the edge was requested) if specified. As another example, the query assoc_update{node ID1, edge type1, node ID2, metadata (not always specified)} causes the receiving cache node (which stores node ID1) to update the edge between the node identified by node ID1 and the node identified by node ID2. As another example, the query assoc_delete{node ID1, edge type1 (not always specified), node ID2} causes the receiving cache node (which stores node ID1) to delete the edge between the node identified by node ID1 and the node identified by node ID2. As another example, the query assoc_get{node ID1, edge type1, sortkey (not always specified), start (not always specified), limit (not always specified)} causes the receiving cache node (which stores node ID1) to return the node IDs of the nodes connected to the node identified by node ID1 by edges of edge type1. Additionally, if specified, the sortkey specifies a filter. For example, if the sortkey specifies a timestamp, the receiving cache node (which stores node ID1) returns the node IDs of the nodes connected to the node identified by node ID1 by edges of edge type1 which were created between the time value specified by the start parameter and the time value specified by the limit parameter. As another example, the query assoc_exists{node ID1, edge type1, list of other node IDs, sortkey (not always specified), start (not always specified), limit (not always specified)} causes the receiving cache node (which stores node ID1) to return the node IDs of the nodes specified in the list of other node IDs connected to the node identified by shard ID1 by edges of edge type1. In addition, the queries described above may be sent in the described form and used to update the leader cache nodes 114.

In one implementation, the caching layer implemented by the follower and leader cache clusters 108 and 106 cache maintain association data in one or more indexes in a manner that supports high query rates for one or more query types. In some implementations, the invention facilitates efficient intersection, membership and filtering queries directed to associations between nodes in the graph. For example, in one implementation, the caching layer caches information in a manner optimized to handle point lookup, range and count queries for a variety of associations between nodes. For example, in constructing a page, a client server 104 may issue a query for all friends of a given user. The client server 104 may issue an assoc_get query identifying the user and the "friend" edge type. To facilitate handling of the query, a cache node in the caching layer may store associations of a given type (such as "friends", "fans", "members", "likes", etc.) between a first node (e.g., a node corresponding to a user) and a node corresponding to contacts or friends of a user. In addition, to construct another party of the page, a client server 104 may issue a query of the last N set of wall posts on the profile, by issuing a assoc_get query identifying the user or user profile, the "wallpost" edge type and a limit value. Similarly, comments to a particular wall post can be retrieved in a similar manner.

In one implementation, the caching layer implemented by the follower cache clusters 106 and the leader cache clusters maintain a set of in-memory structures for associations between nodes (id1, id2) in the graph that facilitate fast searching and handle high query rates. For example, for each (id1,type) association set (a set of all associations that originate at id1 and have a given type), the caching layer maintains two in-memory indexes. As discussed above, these association sets are maintained by cache nodes in each cluster that based on the shard in which id1 falls. Still further, given the structure discussed below, a given association between two nodes may be stored in two association sets each directed to the respective nodes of the association. A first index is based on a temporal attribute (e.g., time stamps) and supports range queries. A second index by id2 does not support range queries, but supports better time complexity of inserts and look ups. In one implementation, the first index is an ordered dynamic array of association entries stored in a circular buffer. Each entry in the circular buffer describes or corresponds to one association and contains the following fields: a) $flags (1 byte) (indicating the visibility of an association); b) $id2 (8 bytes); C) $time (4 bytes); d)$data (8 bytes) ($data is a fixed size 8 byte field (when more than 8 bytes are needed for $data, this becomes a pointer to another memory chunk to hold the full $data value; $data is optional for a given assoc type); and e) $link (8 bytes) offsets of next and previous entries in the same id2 index bucket (see below). In one implementation, the array is ordered by the $time attribute ascending. The number of entries in the index is capped (such as 10,000) and configurable by association type. When the limit is reached the array wraps around. Because the array is $time-sorted, most new entries will be appended at the end without shifting any of the existing elements.

In one implementation, the primary index can be stored in a single memcache key that can be looked up by name ("assoc:<id1>:<type>") through a global memcached hash table. The array can be fronted with a header containing the following fields: a) count (4 bytes): the count of visible associations in the (id1,type) association set (stored persistently, not just the cached entries in the index); b) head (4bytes): the byte offset of array head (element that sorts highest) in the circular buffer; c) tail (4 bytes): the byte offset of array tail (element that sorts lowest) in the circular buffer; and d) id2 index pointer (8 bytes): a pointer to a block containing an id2 hash table.

The second ($id2) index is implemented, in one embodiment, as a hash table and supports quick inserts and lookups for a given ($id1, $type, $id2) association. The hash table itself, in one implementation, may be stored in a separate block allocated with memcached's memory allocator. The table is an array of offsets into the primary index, each identifying the first element in the corresponding hash bucket. Elements are linked into a bucket through their $link fields. Storing the hash table in a separate block allows implementers to resize the table and the primary index independently, thus reducing the amount of memory copied as the association set grows. Linking association entries into buckets in-place also improves memory efficiency. The hash table (and bucket lists) may need to be rebuilt when entries marked hidden or deleted are expunged from the index, but this can be done infrequently.

Accordingly, as a new association of the same <type> is added, a cache node 112, 114 ads the newly associated object to the hash table and the circular buffer, removing the oldest entry from the circular buffer. As discussed above, the <sortkey> value can be used to sort matching entries based on the attribute, such as a time stamps. In addition, a <limit> value limits the number of returned results to the first N values, where N=<limit>. This configuration allows for serving queries regarding associations between nodes at a very high query rate. For example, a first query may ask to display a set of friends in a section of a web page. A cache node can quickly respond to a get_assoc (id1, type, sortkey, limit) query by looking up association set corresponding to id1 by accessing the primary index and retrieving the first N (where N=limit) id2 entries in the circular buffer. In addition, the hash table of the secondary index facilitates point look ups. Still further, the count value maintained by the caching layer facilitates fast responses to the count of a given association set (id1, type).

Some general examples of storing and serving data will now be described (more specific examples relating to particular example implementations of a social graph will be described later after the particular example implementations of the social graph are described). For example, when a client server 104 receives a request for a web page, such as from a user of networking system 100, or from another server, component, application, or process of networking system 100 (e.g., in response to a user request), the client server 104 may need to issue one or more queries in order to generate the requested web page. In addition, as a user interacts with networking system 100, the client server 104 may receive requests that establish or modify object nodes and/or associations be object nodes. In some instances, the request received by a client server 104 generally includes the node ID representing the user on whose behalf the request to the client server 104 was made. The request may also, or alternately, include one or more other node IDs corresponding to objects the user may want to view, update, delete, or connect or associate (with an edge).

For example, a request may be a read request for accessing information associated with the object or objects the user wants to view (e.g., one or more objects for serving a web page). For example, the read request may be a request for content stored for a particular node. For example, a wall post on a user profile can be represented as a node with an edge type of "wallpost." Comments to the wallpost can also be represented as nodes in the graph with edge type "comment" associations to the wallpost. In such an example, in particular embodiments, the client server 104 determines the shard ID corresponding to the node ID of the object (node) that includes the content or other information requested, uses the mapping table to determine which of the follower cache nodes 112 (in the follower cache cluster 106 that serves the client server 104) stores the shard ID, and transmits a query including the shard ID to the particular one of the follower cache nodes 112 storing the information associated with and stored with the shard ID. The particular cache node 112 then retrieves the requested information (if cached within the corresponding shard) and transmits the information to the requesting client server 104, which may then serve the information to the requesting user (e.g., in the form of an HTML or other structured document that is renderable by the web browser or other document-rendering application running on the user's computing device. If the requested information is not stored/cached within the follower cache node 112, the follower cache node 112 may then determine, using the mapping table, which of the leader cache nodes 114 stores the shard storing the shard ID and forwards the query to the particular leader cache node 114 that stores the shard ID. If the requested information is cached within the particular leader cache node 114, the leader cache node 114 may then retrieve the requested information and forward it to the follower cache node 112, which then updates the particular shard in the follower cache node 112 to store the requested information with the shard ID and proceeds to serve the query as just described to the client server 104, which may then serve the information to the requesting user. If the requested information is not cached within the leader cache node 114, the leader cache node 114 may then translate the query into the language of database 110, and transmit the new query to database 110, which then retrieves the requested information and transmits the requested information to the particular leader cache node 114. The leader cache node 114 may then translate the retrieved information back into the graphical language understood by the graph management software, update the particular shard in the leader cache node 114 to store the requested information with the shard ID, and transmit the retrieved information to the particular follower cache node 112, which then updates the particular shard in the follower cache node 112 to store the requested information with the shard ID and proceeds to serve the query as just described to the client server 104, which may then serve the information to the requesting user.

As another example, the user request may be a write request to update existing information or store additional information for a node or to create or modify an edge between two nodes. In the former case, if the information to be stored is for a non-existing node, the client server 104 receiving the user request transmits a request for a node ID for a new node to the respective follower cache cluster 106 serving the client server 104. In some cases or embodiments, the client server 104 may specify a particular shard within which the new node is to be stored (e.g., to co-locate the new node with another node). In such a case, the client server 104 requests a new node ID from the particular follower cache node 112 storing the specified shard. Alternately, the client server 104 may pass a node ID of an existing node with the request for a new node ID to the follower cache node 112 storing the shard that stores the passed node ID to cause the follower cache node 112 to respond to the client server 104 with a node ID for the new node that is in the range of node IDs stored in the shard. In other cases or embodiments, the client server 104 may select (e.g., randomly or based on some function) a particular follower cache node 112 or a particular shard to send the new node ID request to. Whatever the case, the particular cache node 112, or more particularly the graph management software running on the follower cache node 112, then transmits the new node ID to the client server 104. The client server 104 may then formulate a write request that includes the new node ID to the corresponding follower cache node 112. The write request may also specify a node type of the new node and include a payload (e.g., content to be stored with the new node) and/or metadata (e.g., the node ID of the user making the request, a timestamp indicating when the request was received by the client server 104, among other data) to be stored with the node ID. For example, the write request sent to the follower cache node 112 may be of the form object_add {node ID, node type, payload, metadata}. Similarly, to update a node, the client server 104 may send a write request of the form object_modify{node ID, node type, payload, metadata} to the follower cache node 112 storing the shard within which the node ID is stored. Similarly, to delete a node, the client server 104 may send a request of the form object_delete{node ID} to the follower cache node 112 storing the shard within which the shard ID is stored.

In particular embodiments, the follower cache node then transmits the request to the leader cache node 114 storing the shard that stores the corresponding node ID so that the leader cache node 114 may then update the shard. The leader cache node 114 then translates the request into the language of database 110 and transmits the translated request to the database 110 so that the database may then be updated.

Figure 4:
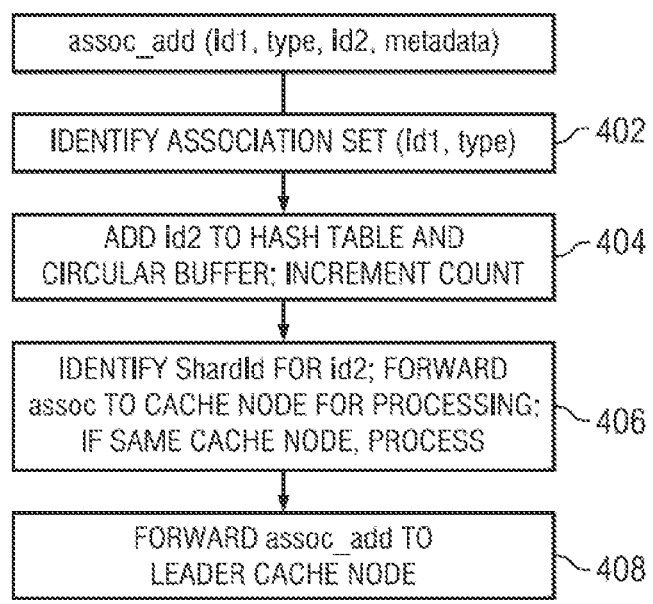
FIG. 4 shows a flowchart illustrating an example method for adding a new association to a graph.

FIG. 4 illustrates an example method for processing a request to add an association (assoc_add) between two nodes. As FIG. 4 illustrates, when a follower cache node 112 receives an assoc_add request (e.g., assoc_add(id1, type, id2, metadata), it accesses an index to identify the association set object corresponding to id1 and type (402). Follower cache nodes 112 adds id2 to both the hash table and the circular buffer of the association set object and increments the count value of the association set object (404). The association set object now maintains the new association of the given type between node id1 and node id2. To facilitate searching of the association relative to id2, follower cache node 112 identifies the shard Id corresponding to the node identifier id2 and forwards the assoc_add request to the follower cache node 112 in the cluster that handles the identified shard (406). If the instant follower cache node 112 handles the shard, it processes the assoc_add request. In one implementation, the forwarding follower cache node 112 may transmit a modified assoc_add request that signals that this is an update required to establish a bi-directional association in the cache layer. The follower cache node 112 also forwards the assoc_add request to the leader cache node 114 corresponding to the shard in which id1 falls (408). The leader cache node 114 may execute a similar process to establish a bi-directional association in the leader cache cluster. The leader cache node 114 also causes the new association to be persisted in database 110. In this manner, an association between node id1 and node id2 is now searchable in an index with reference to id1 and type, and separately, id2 and type.

In particular embodiments, the graph can maintain a variety of different node types, such as users, pages, events, wall posts, comments, photographs, videos, background information, concepts, interests and any other element that would be useful to represent as a node. Edge types correspond to associations between the nodes and can include friends, followers, subscribers, fans, likes (or other indications of interest), wallpost, comment, links, suggestions, recommendations, and other types of associations between nodes. In one implementation, a portion of the graph can be a social graph including user nodes that each correspond to a respective user of the social network environment. The social graph may also include other nodes such as concept nodes each devoted or directed to a particular concept as well as topic nodes, which may or may not be ephemeral, each devoted or directed to a particular topic of current interest among users of the social network environment. In particular embodiments, each node has, represents, or is represented by, a corresponding web page ("profile page") hosted or accessible in the social network environment. By way of example, a user node may have a corresponding user profile page in which the corresponding user can add content, make declarations, and otherwise express himself or herself. By way of example, as will be described below, various web pages hosted or accessible in the social network environment such as, for example, user profile pages, concept profile pages, or topic profile pages, enable users to post content, post status updates, post messages, post comments including comments on other posts submitted by the user or other users, declare interests, declare a "like" (described below) towards any of the aforementioned posts as well as pages and specific content, or to otherwise express themselves or perform various actions (hereinafter these and other user actions may be collectively referred to as "posts" or "user actions"). In some embodiments, posting may include linking to, or otherwise referencing additional content, such as media content (e.g., photos, videos, music, text, etc.), uniform resource locators (URLs), and other nodes, via their respective profile pages, other user profile pages, concept profile pages, topic pages, or other web pages or web applications. Such posts, declarations, or actions may then be viewable by the authoring user as well as other users. In particular embodiments, the social graph further includes a plurality of edges that each define or represent a connection between a corresponding pair of nodes in the social graph. As discussed above, each item of content may be a node in the graph linked to other nodes.

As just described, in various example embodiments, one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. As used herein, a "registered user" refers to a user that has officially registered within the social network environment (Generally, the users and user nodes described herein refer to registered users only, although this is not necessarily a requirement in other embodiments; that is, in other embodiments, the users and user nodes described herein may refer to users that have not registered with the social network environment described herein). In particular embodiments, each user has a corresponding "profile" page stored, hosted, or accessible by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. As used herein, an "authenticated user" refers to a user who has been authenticated by the social network environment as being the user claimed in a corresponding profile page to which the user has administrative rights or, alternately, a suitable trusted representative of the claimed user.

A connection between two users or concepts may represent a defined relationship between users or concepts of the social network environment, and can be defined logically in a suitable data structure of the social network environment as an edge between the nodes corresponding to the users, concepts, events, or other nodes of the social network environment for which the association has been made. As used herein, a "friendship" represents an association, such as a defined social relationship, between a pair of users of the social network environment. A "friend," as used herein, may refer to any user of the social network environment with which another user has formed a connection, friendship, association, or relationship with, causing an edge to be generated between the two users. By way of example, two registered users may become friends with one another explicitly such as, for example, by one of the two users selecting the other for friendship as a result of transmitting, or causing to be transmitted, a friendship request to the other user, who may then accept or deny the request. Alternately, friendships or other connections may be automatically established. Such a social friendship may be visible to other users, especially those who themselves are friends with one or both of the registered users. A friend of a registered user may also have increased access privileges to content, especially user-generated or declared content, on the registered user's profile or other page. It should be noted, however, that two users who have a friend connection established between them in the social graph may not necessarily be friends (in the conventional sense) in real life (outside the social networking environment). For example, in some implementations, a user may be a business or other non-human entity, and thus, incapable of being a friend with a human being user in the traditional sense of the word.

As used herein, a "fan" may refer to a user that is a supporter or follower of a particular user, web page, web application, or other web content accessible in the social network environment. In particular embodiments, when a user is a fan of a particular web page ("fans" the particular web page), the user may be listed on that page as a fan for other registered users or the public in general to see. Additionally, an avatar or profile picture of the user may be shown on the page (or in/on any of the pages described below). As used herein, a "like" may refer to something, such as, by way of example and not by way of limitation, a post, a comment, an interest, a link, a piece of media (e.g., photo, photo album, video, song, etc.) a concept, an entity, or a page, among other possibilities (in some implementations a user may indicate or declare a like to or for virtually anything on any page hosted by or accessible by the social network system or environment), that a user, and particularly a registered or authenticated user, has declared or otherwise demonstrated that he or she likes, is a fan of, supports, enjoys, or otherwise has a positive view of In one embodiment, to indicate or declare a "like" or to indicate or declare that the user is a "fan" of something may be processed and defined equivalently in the social networking environment and may be used interchangeably; similarly, to declare oneself a "fan" of something, such as a concept or concept profile page, or to declare that oneself "likes" the thing, may be defined equivalently in the social networking environment and used interchangeably herein. Additionally, as used herein, an "interest" may refer to a user-declared interest, such as a user-declared interest presented in the user's profile page. As used herein, a "want" may refer to virtually anything that a user wants. As described above, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a celebrity, a person who is not a registered user, or even, an event, in some embodiments, another user (e.g., a non-authenticated user), etc. By way of example, there may be a concept node and concept profile page for "Jerry Rice," the famed professional football player, created and administered by one or more of a plurality of users (e.g., other than Jerry Rice), while the social graph additionally includes a user node and user profile page for Jerry Rice created by and administered by Jerry Rice, himself (or trusted or authorized representatives of Jerry Rice).

FIG. 5 illustrates a distributed, redundant system. In the implementation shown, the distributed redundant system includes at least first and second data centers 102a, 102b. Each of the data centers 102a, 102b includes one or more follower cache clusters 106 and a leader cache cluster 108a, 108b. In one implementation, leader cache cluster 108a acts as a primary (master) cache cluster, while leader cache cluster 108b is a secondary (slave) cache cluster. In one implementation, data centers 102a, 102b are redundant in the sense that synchronization functions are employed to achieve replicated copies of the database 110. In one implementation, data center 102a may be physically located at one geographic region (such as the West Coast of the United States) to serve traffic from that region, while data center 102b may be physically located at another geographic region (such as the East Coast of the United States). Given that users from either of these regions may access the same data and associations, efficient synchronization mechanisms are desired.

Figure 6:
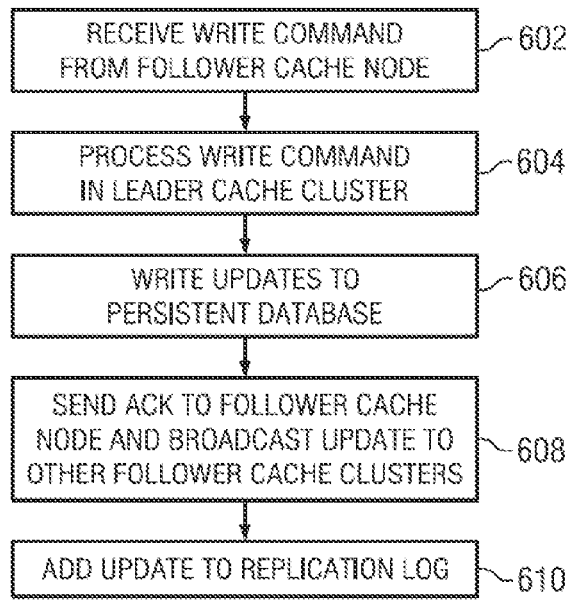
FIG. 6 shows a flowchart illustrating an example method for processing changes to graph data.

FIG. 6 illustrates an example method of how a leader cache node 114 processes write commands. As discussed above and with reference to FIG. 5, a follower cache node 112 may receive a write command to add/update an object or association from a client server 104 (FIG. 5, No. 1). The follower cache node 112 forwards the write command to a corresponding leader cache node 114 (FIG. 5, No. 2). When the leader cache node 114 receives a write command from a follower cache node (602), it processes the write command to update one or more entries in the cache maintained by the leader cache cluster 108a (604) and writes the update to persistent database 110a (606) (FIG. 5, No. 3). The leader cache node 114 also acknowledges the write command (ACK) to the follower cache node 112 and broadcasts the update to other follower cache clusters 106 of the data center 102a (FIG. 5, No. 4a) and the secondary leader cache cluster 108b, which forwards the update to its follower cache clusters 106 (FIG. 5, No. 4b) (608). As FIG. 6 illustrates, the leader cache node 114 also adds the update to a replication log (610). The databases 110a, 110b implement a synchronization mechanism, such as MySQL Replication, to synchronize the persistent databases.

Figure 7:
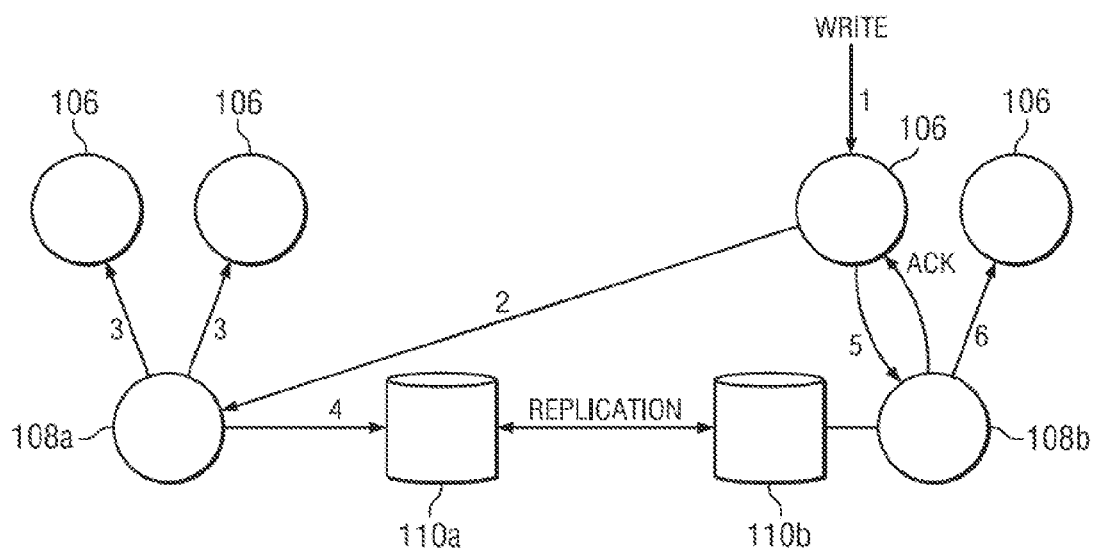
FIG. 7 is a schematic diagram illustrating an example message flow between various components of a caching system.

FIG. 7 illustrates a message flow according to one implementation of the invention. When a write command is received at a follower cache node 112 in a ring 106 that is not directly associated with the primary leader cache cluster 108a (FIG. 7, No. 1), the follower cache node 112 forwards the write message to the primary leader cache cluster 108a for processing (FIG. 7, No. 2). A leader cache node 114 in the primary leader cache cluster 108a may then broadcast the update to its follower cache clusters 106 (FIG. 7, No. 3) and writes the changes to database 110a. As FIG. 7 shows, the follower cache node 112 that received the write command may also forward the write command to its secondary leader cache cluster 108b (FIG. 7, No. 5), which broadcasts the updates to other follower cache clusters 106 (FIG. 7, No. 5). The foregoing architecture allows for therefore allows for changes to the caching layer to be quickly replicated across data centers, while the separate replication between databases 110a, 110b allow for data security.

The applications or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 2:
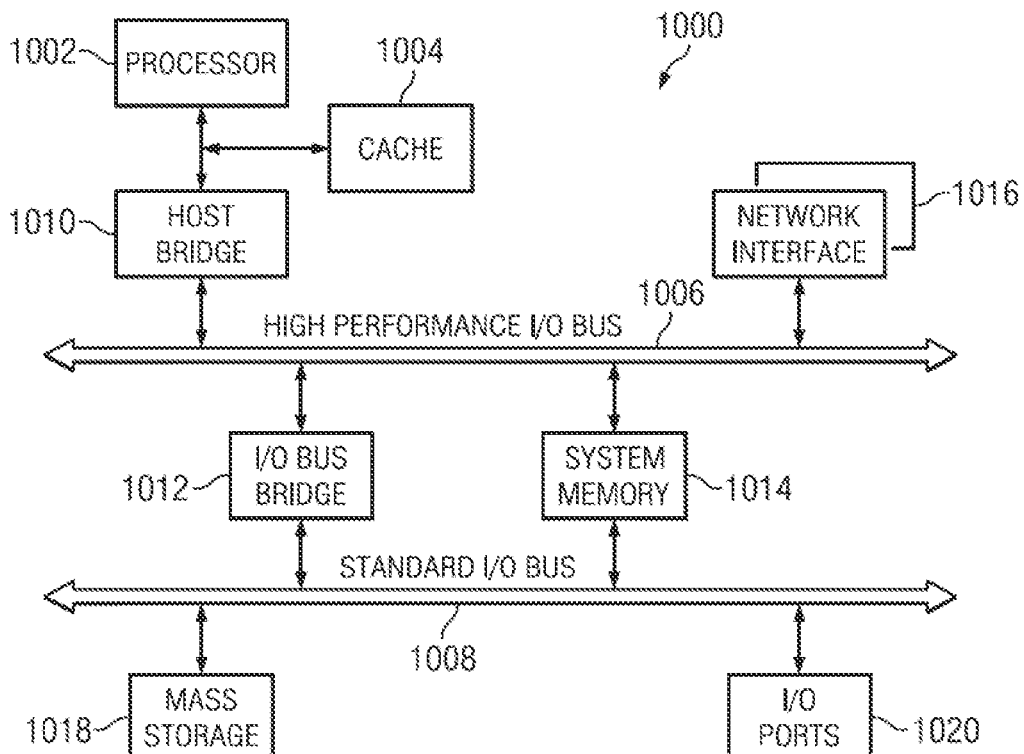
FIG. 2 illustrates an example computer system architecture.

FIG. 2 illustrates an example computing system architecture, which may be used to implement a server 22a, 22b. In one embodiment, hardware system 1000 comprises a processor 1002, a cache memory 1004, and one or more executable modules and drivers, stored on a tangible computer readable medium, directed to the functions described herein. Additionally, hardware system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network/communication interfaces 1016 couple to bus 1006. Hardware system 1000 may further include video memory (not shown) and a display device coupled to the video memory. Mass storage 1018, and I/O ports 1020 couple to bus 1008. Hardware system 1000 may optionally include a keyboard and pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, etc. Mass storage 1018 provides permanent storage for the data and programming instructions to perform the above-described functions implemented in the servers 22a, 22b, whereas system memory 1014 (e.g., DRAM) provides temporary storage for the data and programming instructions when executed by processor 1002. I/O ports 620 are one or more serial and/or parallel communication ports that provide communication between additional peripheral devices, which may be coupled to hardware system 1000.

Hardware system 1000 may include a variety of system architectures; and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present invention may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

In one implementation, the operations of the embodiments described herein are implemented as a series of executable modules run by hardware system 1000, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1002. Initially, the series of instructions may be stored on a storage device, such as mass storage 1018. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 1016. The instructions are copied from the storage device, such as mass storage 1018, into memory 1014 and then accessed and executed by processor 1002.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications and models data as a graph of associations. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A system comprising:
one or more first computing devices providing a persistent-storage database operative to maintain a graph data structure comprising a plurality of graph nodes and a plurality of graph edges connecting the graph nodes, a graph edge connecting two graph nodes indicating an association between the two graph nodes, each graph node being a data object corresponding to a profile associated with a social-networking system and having a unique graph-node identifier; and
a plurality of second computing devices coupled to the one or more first computing devices and providing a cache layer between the persistent-storage database and a plurality of client servers, the cache layer comprising a plurality of follower cache clusters that each comprise one or more follower cache nodes, each follower cache node comprising one or more one individual computing system, each follower cache node being operative to:
maintain in the follower cache node at least a portion of the graph data structure, wherein the portion of the graph data structure comprises a plurality of graph nodes and a plurality of graph edges, and wherein a count value of an association set is maintained for each graph node, the count value being either increased or decreased in response to commands to add or delete an association with respect to the graph node, respectively;
receive a query from a user of the social-networking system for associations between nodes in the portion of the graph data structure maintained in the follower cache node, wherein the user is associated with a particular profile that corresponds to a graph node in the portion of the graph data structure maintained in the follower cache node; and
respond to the query for associations between nodes in the graph data structure at least in part by accessing the portion of the graph data structure maintained in the follower cache node.

2. The system of claim 1, wherein the follower cache node is operative to respond to the query by:
storing, updating, deleting, or retrieving information associated with at least one graph node or graph edge in the portion of the graph data structure maintained in the follower cache node based on the query;
modifying the query for processing by the persistent-storage database; and
forwarding the query as modified to the persistent-storage database for processing.

3. The system of claim 1, wherein each follower cache cluster is allocated a subset of a plurality of data shards.

4. The system of claim 1, wherein the cache layer further comprises a leader cache cluster comprising a plurality of leader cache nodes.

5. The system of claim 1, wherein the follower cache node is further operative to:
maintain in the memory, for each association set corresponding to a first graph node of a plurality of graph nodes and an association type of a plurality of association types, a first index and a second index, the first index comprising an ordered array of entries, each entry comprising a graph-node identifier of a second graph node that is associated with the first node and a sorting attribute, the second index comprising a hash table comprising entries corresponding to the node identifiers of respective second nodes that are associated with the first node;

receive a command to add an association of a first association type between a first node and a second node, the command including a first node identifier and a second node identifier; and access the memory against the first association type and the first node identifier to add the second node identifier to a first index and a second index corresponding to the first association type and the first node identifier.

6. The system of claim 5, wherein the follower cache node is further operative to:

maintain the count value for each association set;

increment count values in response to commands to add an association corresponding to respective association sets; and decrement count values in response to commands to delete an association corresponding to respective association sets.

7. The system of claim 1, wherein:

at least a portion of the graph data structure is a social graph of the social-networking system;

at least some of the nodes correspond to one or more profiles of one or more users of the social-networking system, respectively; and at least some of the nodes correspond to one or more profiles of one or more concepts associated with the social-networking system, respectively.

8. A method comprising:

by one or more first computing devices, providing a persistent-storage database operative to maintain a graph data structure comprising a plurality of graph nodes and a plurality of graph edges connecting the graph nodes, a graph edge connecting two graph nodes indicating an association between the two graph nodes, each graph node being a data object corresponding to a profile associated with a social-networking system and having a unique graph-node identifier; and by a plurality of second computing devices coupled to the one or more first computing devices and providing a cache layer between the persistent-storage database and a plurality of client servers, the cache layer comprising a plurality of follower cache clusters that each comprise one or more follower cache nodes, each follower cache node comprising one or more one individual computing system, each follower cache node being operative to:

maintaining in the follower cache node at least a portion of the graph data structure, wherein the portion of the graph data structure comprises a plurality of graph nodes and a plurality of graph edges, and wherein a count value of an association set is maintained for each graph node, the count value being either increased or decreased in response to commands to add or delete an association with respect to the graph node, respectively;

receiving a query from a user the social-networking system for associations between nodes in the portion of the graph data structure maintained in the follower cache node, wherein the user is associated with a particular profile that corresponds to a graph node in the portion of the graph data structure maintained in the follower cache node; and responding to the query for associations between nodes in the graph data structure at least in part by accessing the portion of the graph data structure maintained in the follower cache node.

9. The method of claim 8, wherein responding to a query comprises:

storing, updating, deleting, or retrieving information associated with at least one node or edge in the portion of the graph data structure maintained in the follower cache node based on the query;

modifying the query for processing by the persistent-storage database; and forwarding the query as modified to the persistent-storage database for processing.

10. The method of claim 8, wherein each follower cache cluster is allocated a subset of a plurality of data shards.

11. The method of claim 8, wherein the cache layer further comprises a leader cache cluster comprising a plurality of leader cache nodes.

12. The method of claim 8, wherein each of the follower cache nodes is operative to:

maintain in the memory, for each association set corresponding to a first graph node of a plurality of graph nodes and an association type of a plurality of association types, a first index and a second index, the first index comprising an ordered array of entries, each entry comprising a graph-node identifier of a second graph node that is associated with the first node and a sorting attribute, the second index comprising a hash table comprising entries corresponding to the node identifiers of respective second nodes that are associated with the first node;

receive a command to add an association of a first association type between a first node and a second node, the command including a first node identifier and a second node identifier; and access the memory against the first association type and the first node identifier to add the second node identifier to a first index and a second index corresponding to the first association type and the first node identifier.

13. The method of claim 12, wherein each of the follower cache nodes is further operative to:

maintain the count value for each association set;

increment count values in response to commands to add an association corresponding to respective association sets; and decrement count values in response to commands to delete an association corresponding to respective association sets.

14. The method of claim 8, wherein:

at least a portion of the graph data structure is a social graph of the social-networking system;

at least some of the nodes correspond to one or more profiles of one or more users of the social-networking system, respectively; and at least some of the nodes correspond to one or more profiles of one or more concepts associated with the social-networking system, respectively.

15. A plurality of non-transitory computer-readable storage media embodying software that is operative when executed to:

provide a persistent-storage database operative to maintain a graph data structure comprising a plurality of graph nodes and a plurality of graph edges connecting the graph nodes, a graph edge connecting two graph nodes indicating an association between the two graph nodes, each graph node being a data object corresponding to a profile associated with a social-networking system and having a unique graph-node identifier; and provide a cache layer between the persistent-storage database and a plurality of client servers, the cache layer comprising a plurality of follower cache clusters that each comprise one or more follower cache nodes, each follower cache node comprising one or more one individual computing system, each follower cache node being operative to:

maintain in the follower cache node at least a portion of the graph data structure, wherein the portion of the graph data structure comprises a plurality of graph nodes and a plurality of graph edges, and wherein a count value of an association set is maintained for each graph node, the count value being either increased or decreased in response to commands to add or delete an association with respect to the graph node, respectively;

receive a query from a user of the social-networking system for associations between nodes in the portion of the graph data structure maintained in the follower cache node, wherein the user is associated with a particular profile that corresponds to a graph node in the portion of the graph data structure maintained in the follower cache node; and respond to the query for associations between nodes in the graph data structure at least in part by accessing the portion of the graph data structure maintained in the follower cache node.

16. The media of claim 15, wherein the follower cache node is operative to respond to the query by:

storing, updating, deleting, or retrieving information associated with at least one graph node or graph edge in the portion of the graph data structure maintained in the follower cache node based on the query;

modifying the query for processing by the persistent-storage database; and forwarding the query as modified to the persistent-storage database for processing.

17. The media of claim 15, wherein each follower cache cluster is allocated a subset of a plurality of data shards.

18. The media of claim 15, wherein the cache layer further comprises a leader cache cluster comprising a plurality of leader cache nodes.

19. The media of claim 15, wherein the follower cache node is further operative to:

maintain in the memory, for each association set corresponding to a first graph node of a plurality of graph nodes and an association type of a plurality of association types, a first index and a second index, the first index comprising an ordered array of entries, each entry comprising a graph-node identifier of a second graph node that is associated with the first node and a sorting attribute, the second index comprising a hash table comprising entries corresponding to the node identifiers of respective second nodes that are associated with the first node;

receive a command to add an association of a first association type between a first node and a second node, the command including a first node identifier and a second node identifier; and access the memory against the first association type and the first node identifier to add the second node identifier to a first index and a second index corresponding to the first association type and the first node identifier.

20. The media of claim 19, wherein the follower cache node is further operative to:

maintain the count value for each association set;

increment count values in response to commands to add an association corresponding to respective association sets; and decrement count values in response to commands to delete an association corresponding to respective association sets.

* * * * *